(12) United States Patent
Araki et al.

(10) Patent No.: US 7,451,284 B2
(45) Date of Patent: Nov. 11, 2008

(54) STORAGE SYSTEM AND CONTROL METHOD OF THE SAME

(75) Inventors: Masanori Araki, Odawara (JP); Kenji Yamagami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 11/003,075

(22) Filed: Dec. 2, 2004

(65) Prior Publication Data

US 2006/0080503 A1 Apr. 13, 2006

(30) Foreign Application Priority Data

Oct. 12, 2004 (JP) ............................ 2004-297716

(51) Int. Cl.
*G06F 12/00* (2006.01)
*G06F 13/00* (2006.01)
*G06F 13/28* (2006.01)

(52) U.S. Cl. ................. 711/162; 711/100; 711/117; 711/161

(58) Field of Classification Search ............. 711/162, 711/114

See application file for complete search history.

(56) References Cited

U.S. PATENT DOCUMENTS

| | | | |
|---|---|---|---|
| 5,347,653 A * | 9/1994 | Flynn et al. ............. | 707/203 |
| 5,720,026 A | 2/1998 | Uemura et al. | |
| 6,434,681 B1 | 8/2002 | Armangau | |
| 6,584,551 B1 * | 6/2003 | Huber ..................... | 711/162 |
| 6,990,553 B2 | 1/2006 | Nakayama et al. | |
| 2005/0086432 A1 * | 4/2005 | Sakai ..................... | 711/114 |

FOREIGN PATENT DOCUMENTS

JP 10-289172 A 10/1998

* cited by examiner

*Primary Examiner*—Hyung S Sough
*Assistant Examiner*—Gary W Cygiel
(74) *Attorney, Agent, or Firm*—Townsend and Townsend and Crew LLP

(57) ABSTRACT

The invention provides a storage system which can estimate a necessary capacity at the time of acquiring a snap shot copy without actually sampling the snap shot copy, and a control method of the same. In a storage system, a disk control unit monitors a write instruction from a host machine for a fixed period, and calculates a capacity necessary at the time of a snap shot, on the basis of the monitored information for the fixed period, in the case of receiving an instruction of calculating the capacity necessary at the time of acquiring the snap shot which makes it possible to refer to the data at a certain time point within a disk unit.

24 Claims, 14 Drawing Sheets

FIG.12

| LU# | Snap Y/N | One Time | 6Hr | 12Hr | 24Hr | ACQUIRED GENERATION NUMBER |
|---|---|---|---|---|---|---|
| 00 | ✓ |  |  |  |  | 1 |
| 01 |  | ✓ |  |  |  |  |
| 02 | ✓ |  |  |  |  | 7 |
| 03 |  |  |  |  | ✓ |  |
| 04 | ✓ |  | ✓ |  | ✓ | 3 |
| 05 | ✓ |  |  |  |  | 4 |
| Total | 18 | 3 | 4 | 0 | 11 |  |

SNAP SHOT ACQUIREMENT

CU Number: 03

☐ Real Snap Shot   ☑ Dry Run

CURRENT TIME : 14:08:00

Plan File name : C:¥MyDocuments¥SnapPlane¥plane001.txt

[EXECUTE PLAN] [CAPACITY DISPLAY] [SAVE] [LOAD] [STOP PLAN]

FIG.14

DRY RUN RESULT  Real Snap Shot  ● Dry Run  CURRENT TIME : 20:08:00

CU Number [ 03 ▶ ]

| LU# | ACTUAL CAPACITY | LATEST GENERATION NECESSARY AMOUNT | ACQUIRED GENERATION NUMBER | TOTAL NECESSARY AMOUNT | ACQUIRABLE GENERATION NUMBER |
|---|---|---|---|---|---|
| 00 | 2.8GB | 0.8GB | 1 | 0.8GB | 4 |
| 01 | 2.8GB | | | | |
| 02 | 2.8GB | 1.2GB | 7 | 6.8GB | 28 |
| 03 | 2.8GB | | | | |
| 04 | 2.8GB | 0.4GB | 3 | 1.0GB | 12 |
| 05 | 2.8GB | 1.0GB | 4 | 4.5GB | 16 |
| Total | 716.8GB | 40.5GB | 80 | 250.6GB | NA |

Plan File name : C:¥MyDocuments¥SnapPlane¥plane001.txt

[ OTHER PLAN ]  [ UPDATE ]  [ RETURN ]

STORAGE SYSTEM AND CONTROL METHOD OF THE SAME

CROSS-REFERENCE TO RELATED APPLICATION

The present application claims priority from Japanese Patent Application No. JP 2004-297716 filed on Oct. 12, 2004, the content of which is hereby incorporated by reference into this application.

TECHNICAL FIELD OF THE INVENTION

The present invention relates to a storage system and a control method of the same, and more particularly to a technique which is effectively applied to calculation of a disk capacity required for copying at the time of a snap shot copy.

BACKGROUND OF THE INVENTION

In conventional, in order to speed up a data transfer between communication processing systems, there is a data transfer system structured such as to store an update data of a data file data in an update data file by a sending side communication processing system, and transfer a difference information between the data of the data file and the update data of the update data file at the time of transferring the data to a receiving side communication processing system (for example, refer to Japanese Patent Laid-Open Publication No. 10-289172).

Further, as a technique for managing the update data, there has been developed a technique called as a snap shot structured such that in the case that the update is executed with respect to a storage volume after a certain time point in the storage system, the data before the update is stored in the other storage volume and the data at a certain time point can be referred with respect to the storage volume.

SUMMARY OF THE INVENTION

However, in the structure in which the update data is stored in the update data file as described in the above patent document, it is impossible to estimate the capacity of the update data file necessary for copying, in the case of making use of the system in a state in which the capacity of the update data file is made smaller than the capacity of the data file. Accordingly, it is possible to comprehend a condition that the update data file becomes short or the like, only by actually copying the update date in the update data file.

Further, in the snap shot, the capacity of the other storage volume storing the data before the update is generally smaller than the capacity of the storage volume, and it is impossible to estimate the capacity necessary for copying in the snap shot copy. Accordingly, it is impossible to comprehend a condition that a pool region for the snap shot copy becomes short or the like, only by actually starting the snap shot control and sampling the snap shot copy.

Accordingly, an object of the present invention is to provide a storage system which can estimate a necessary capacity at the time of acquiring a snap shot copy without actually sampling the snap shot copy, and a control method of the same.

Among the inventions disclosed in the present application, a description will be briefly given below of representative structures.

In accordance with the present invention, there is provided a storage system provided with a storage control unit and a disk unit comprised of a plurality of physical storage devices, wherein the storage control unit comprises:

a data transfer control unit controlling a data transfer with respect to a host machine and the disk unit;

a cache memory temporarily storing the data; and a shared memory in which a configuration information of the storage system is stored, and wherein, in the case of receiving an instruction of calculating a capacity necessary at the time of acquiring a snap shot which makes it possible to refer to the data at a certain time point within the disk unit, the storage control unit monitors a write instruction from the host machine for a fixed period, and calculates the capacity necessary at the time of the snap shot, on the basis of the monitored information for the fixed period.

Further, in accordance with the present invention, there is provided a storage system provided with a storage control unit and a disk unit constituted by a plurality of physical storage devices, wherein the storage control unit comprises:

a data transfer control unit controlling a data transfer with respect to a host machine and the disk unit;

a cache memory temporarily storing the data; and a shared memory in which a configuration information of the storage system is stored, and wherein, in the case of receiving an instruction of calculating a capacity necessary at the time of acquiring a snap shot which makes it possible to refer to the data at a certain time point within the disk unit, the storage control unit updates a difference bit map used at the time of the snap shot without executing an actual snap shot copy on the basis of a write instruction from the host machine, and calculates the capacity necessary at the time of the snap shot on the basis of update information of the difference bit map for a fixed period.

Further, in accordance with the present invention, there is provided a control method of a storage system provided with a storage control unit constituted by a data transfer control unit controlling a data transfer with respect to a host machine and the disk unit, a cache memory temporarily storing the data, and a shared memory in which a configuration information of the storage system is stored and with a disk unit comprised of a plurality of physical storage devices, Wherein, in the case of receiving an instruction of calculating a capacity necessary at the time of acquiring the snap shot which makes it possible to refer to the data at a certain time point within the disk unit, a write instruction from the host machine for a fixed period is monitored, and the capacity necessary at the time of the snap shot is calculated, on the basis of the monitored information for the fixed period.

BRIEF DESCRIPTIONS OF THE DRAWINGS

FIG. 12 is a view showing a dry run instruction display of the storage system in accordance with the embodiment of the present invention;

FIG. 14 is a view showing a dry run result display of the storage system in accordance with the embodiment of the present invention;

DESCRIPTION OF THE PREFERRED EMBODIMENTS

Figure 1:
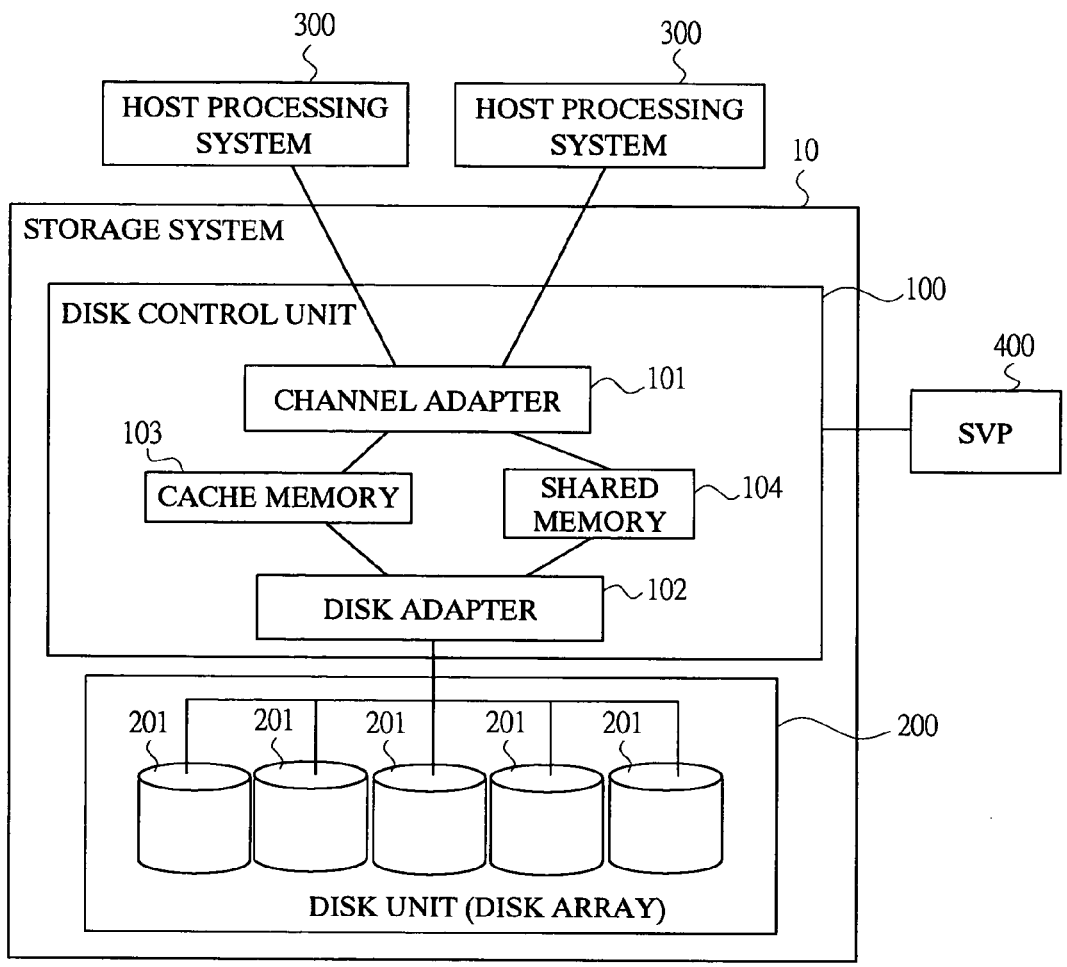
FIG. 1 is a schematic view showing a structure of a storage system in accordance with an embodiment of the present invention.

A description will be in detail given below of an embodiment in accordance with the present invention with reference to the accompanying drawings. In this case, in all the drawings for explaining the embodiment, the same reference numerals are in principle attached to the same members, and a repetitive description will be omitted.

<Structure of Storage System>

A description will be given of a structure of a storage system in accordance with an embodiment of the present invention with reference to FIG. 1. FIG. 1 is a schematic view showing a structure of a storage system in accordance with an embodiment of the present invention.

In FIG. 1, a storage system 10 is comprised of a disk control unit 100 and a disk unit 200.

The disk control unit 100 is comprised of a channel adapter 101, a disk adapter 102, a cache memory 103 and a shared memory 104, and a service processor (SVP) 400 is connected to the disk control unit 100.

The channel adapter 101 is provided with a communication interface for executing a communication with respect to a host processing system (a host machine) 300, and gives and receive a data input and output command or the like with respect to the host processing system 300.

The disk adapter 102 is communicably connected to a plurality of physical storage devices 201 for storing the data, and controls the disk unit 200.

The cache memory 103 temporarily stores the data sent and received between the host processing system 300 and the disk unit 200.

The shared memory 104 stores a control information, a monitor information and the like communicated by the channel adapter 101 and the disk adapter 102.

The service processor 400 is a computer which is used for maintaining and managing the storage system 10. By operating the service processor 400, it is possible, for example, to set the physical storage device 201, set a storage volume, and set a snap shot executed in the disk control unit 100.

The disk unit 200 is provided with a plurality of physical storage devices 201. Accordingly, it is possible to apply a large volume of storage region to the host processing system 300. Further, the disk unit 200 structures redundant arrays of inexpensive disks (RAID) by, for example, a plurality of physical storage devices 201.

<Snap Shot>

Figure 2:
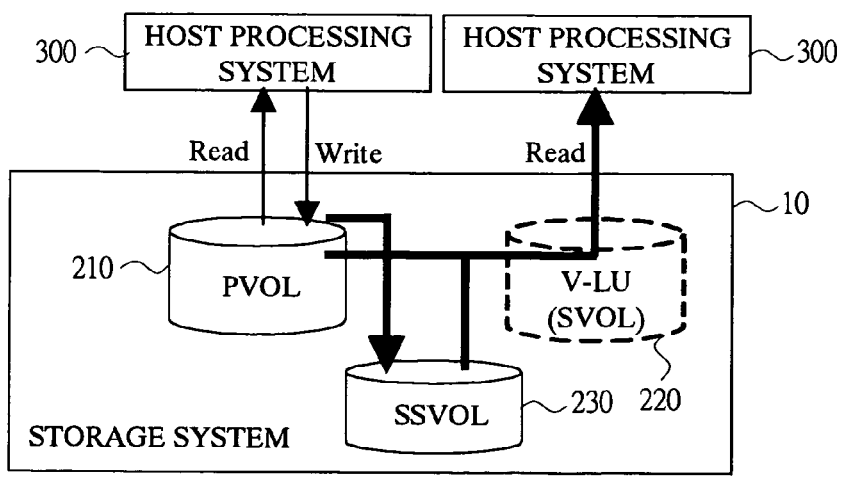
FIG. 2 is an explanatory view for explaining a snap shot of the storage system in accordance with the embodiment of the present invention.
Figure 3:
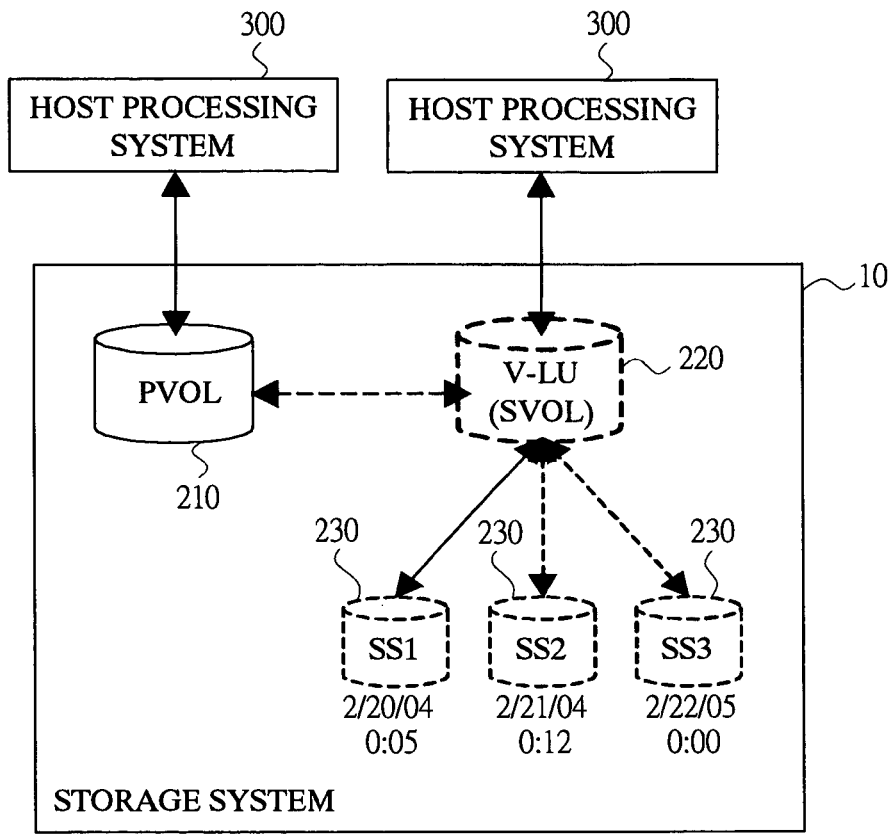
FIG. 3 is an explanatory view for explaining a snap shot of the storage system in accordance with the embodiment of the present invention.
Figure 4:
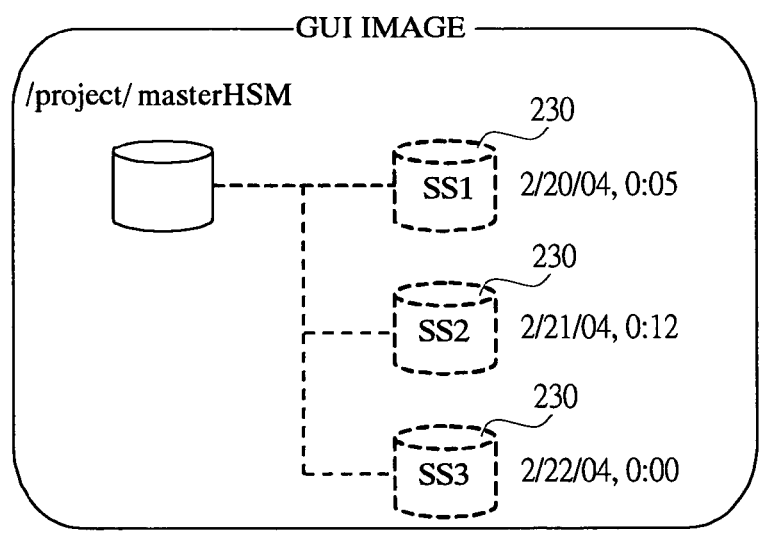
FIG. 4 is a view showing a GUI image of the snap shot of the storage system in accordance with the embodiment of the present invention.

Next, a description will be given of a snap shot of the storage system in accordance with the embodiment of the present invention with reference to FIGS. 2 to 4. FIGS. 2 and 3 are explanatory views for explaining a snap shot of the storage system in accordance with the embodiment of the present invention, and FIG. 4 is a view showing a GUI image of the snap shot of the storage system in accordance with the embodiment of the present invention.

The snap shot is a function of acquiring a copy of the data at a certain time point at a high speed, and it is possible to secure the data at the certain time point by the snap shot.

In FIG. 2, the storage system 10 is provided with a primary volume (PVOL) 210 and a snap shot volume (SSVOL) 230 by the physical storage device 201 within the disk unit 200. Further, the storage system 10 is also provided with a virtual volume (V-LU) 220 corresponding to a virtual volume serving as a secondary volume (SVOL), and is mapped with respect to the primary volume 210 at the time of acquiring the snap shot, and the host processing system 300 is configured such as to access to the data acquired by the snap shot via the virtual volume 220.

With respect to the snap shot, in the case of having acquired the snap shot at a certain time point, when an update is executed to the data within the primary volume 210 in accordance with a write instruction after the snap shot acquiring time point, the data before the update is stored in the snap shot volume 230.

Accordingly, the data of the primary volume 210 is updated in each case of the write instruction after the snap shot acquiring time point, the data before the update of the updated data within the primary volume 210 is stored within the snap shot volume 230, and it is possible to access the data at the snap shot acquiring time point by the data stored within the primary volume 210.

Further, in the case of accessing the data at the snap shot acquiring time point, if the data exists within the snap shot volume 230, it is possible to access the data at the snap shot acquiring time point by accessing the data within the snap shot volume 230. If the data does not exist within the snap shot volume 230, the data within the primary volume 210 is not updated, so that it is possible to access the data at the snap shot acquiring time point by accessing the data within the primary volume 210.

Further, since the access to the snap shot volume 230 is executed via the virtual volume 220, it is possible to access the data acquired by the snap shot at the snap shot acquiring time point by accessing the virtual volume 220, in the host processing system 300.

Further, as shown in FIG. 3, it is possible to acquire a plurality of snap shots, and it is possible to have access to an optional snap shot by changing an association between the virtual volume 220 and a plurality of snap shot volumes 230. At this time, a generation management of the snap shot volume 230 is also executed, and a management or so of the same date is executed between a plurality of snap shot volumes 230.

A selection of the snap shot is executed by selecting the snap shot desired to be accessed on the basis of a display of a snap shot selection as shown in FIG. 4, for example, displayed on the host processing system 300 or the service processor 400. Accordingly, the association between the virtual volume 220 and the selected snap shot volume 230 is changed and there is obtained a state in which it is possible to access from the host processing system 300.

Further, as an interface of the snap shot, the following items are prepared.

(1) Virtual Volume Preparation

The virtual volume 220 has an HDEV (a host device) number and a VDEV space (a cache space). A path can be defined. The host processing system 300 accesses the data acquired by the snap shot via the virtual volume 220.

(2) Snap Shot Pool Definition

The following interfaces are provided:
Defining the snap shot pool;
Adding the HDEV to the snap shot pool; and
Dissolving the snap shot pool.

(3) Snap Shot Acquirement

The primary volume 210 and the virtual volume 220 are designated. The disk adapter 102 assigns a snap shot ID, and starts acquiring the snap shot by associating it to the virtual volume 220.

(4) Snap Shot Deletion

The snap shot ID is designated. The disk adapter 102 breaks the data acquired by the designated snap shot, and releases the snap shot ID.

(5) Mount of Snap Shot (Associate Virtual Volume 220 with the Snap Shot)

The virtual volume 220 and the snap shot ID are designated. When mounting, the host processing system 300 can access the designated snap shot via the virtual volume 220.

(6) Dismount of Snap Shot (Cancel Association Between Virtual Volume 220 and Snap Shot)

The virtual volume 220 is designated. The relation with the snap shot associated with the virtual volume 220 is cancelled. At this time, it is necessary to destroy all the data existing on the cache of the virtual volume 220.

<Module Relevant to Snap Shot>

Figure 5:
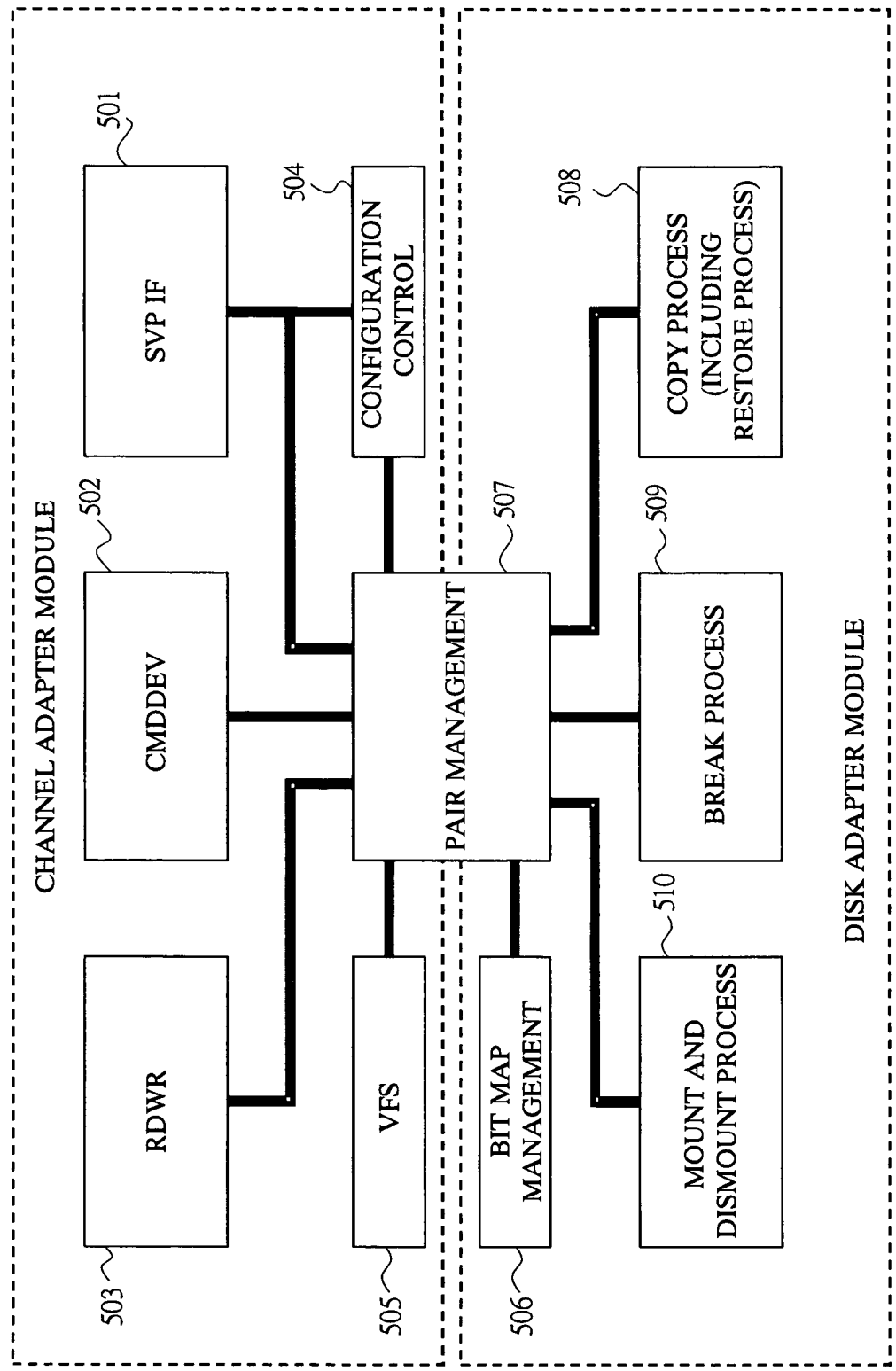
FIG. 5 is a view showing a module relevant to the snap shot of the storage system in accordance with the embodiment of the present invention.

Next, a description will be given of a module relevant to the snap shot of the storage system in accordance with the embodiment of the present invention with reference to FIG. 5. FIG. 5 is a view showing the module relevant to the snap shot of the storage system in accordance with the embodiment of the present invention.

In FIG. 5, as the module relevant to the snap shot, a channel adapter module is provided with a service processor interface (SVP IF) 501, a host command processing unit (CMDDEV) 502, a read and write processing unit (RDWR) 503, a structure control 504, and a virtual volume management unit (VFS) 505.

Further, a disk adapter module is provided with a bit map management 506, a copy process 508, a break process 509 and a mount and dismount process 510.

Further, a pair management 507 is provided as a module relevant to all the modules.

The service processor interface 501 executes an interface process with respect to the service processor 400. For example, it executes a system area definition, a snap shot pool definition to be the snap shot volume 230, a virtual volume definition, a snap shot information acquirement and a part of the snap shot control (deletion, initialization and the like).

The system area is an area for the snap shot control, and is prepared, for example, in the shared memory 104 or the like.

The host command processing unit 502 processes a command group from the host processing system 300, and executes an interface process with respect to the host processing system 300. For example, it executes the snap shot control, and the snap shot information acquirement.

The read and write processing unit 503 executes an anticipation and prefetch copy process determination in accordance with the read and write process from the host processing system 300, and sends a copy message.

The structure control 504 executes a structure control in connection with the snap shot. For example, it executes the system area management, the virtual volume management and the snap shot pool management.

The system area management executes a management only whether or not the system area definition exists, and the definition region (capacity). The virtual volume management unit 505 manages the content of the system area.

The virtual volume management executes a management of the virtual volume definition and cancellation. This includes an assignment between the VDEV spaces. The pair management 507 executes whether or not the virtual volume 220 acquires the snap shot, and whether or not the snap shot is mounted on the virtual volume 220.

The snap shot pool management manages only whether or not the logical devices (LDEV) by a plurality of physical storage devices 201 is defined as the snap shot pool volume. The virtual volume management portion 505 executes a management of an affiliation of the pool group and the stored data.

The virtual volume management portion 505 executes a process in connection with the snap shot pool definition and the system area definition. For example, the virtual volume management portion 505 executes the snap shot pool management, the dynamic address mapping and the pool volume area allocation and release.

The snap shot pool management manages which group the pool volume belongs to. A definition, a cancellation and the like of the pool are executed by the virtual volume management portion 505.

The dynamic address mapping manages where the data acquired by the snap shot exists (whether it exists in the primary volume 210 or the pool volume). A management table (a dynamic address map) is provided in the system area, and executes the memory management on the system region.

The pool volume region assignment and release executes an assignment and release of the pool volume area, in accordance with the instruction of the pair management 507.

The bit map management 506 executes a reservation and release of the bit map area used in the snap shot, a reference of the difference bit and an on and off of the difference bit, in accordance with the instruction of the pair management 507.

The pair management 507 executes a management of the pair state of the primary volume 210 and the virtual volume 220, the reference and the update of the bit map, and the provision of the interface to the virtual volume management unit 505.

The copy process 508 executes an acquirement of the snap shot, a restore process, a virtual volume read process, and a virtual volume destage process.

The acquirement of the snap shot copies the data on the primary volume 210 to the snap shot pool corresponding to the snap shot volume 230.

The restore process copies the data on the snap shot pool to the primary volume 210.

The virtual volume read process copies the data from the primary volume 210 or the snap shot pool to the virtual volume 220 cache in accordance with the virtual volume 220 read. This process copies the data from the primary volume 210 in the case that the virtual volume 220 misses caching and the snap shot is not acquired, and copies the data from the snap shot pool in the case that the virtual volume 220 misses caching and the snap shot is already acquired.

The virtual volume destage process copies the dirty date existing on the virtual volume cache to the snap shot pool.

The break process 509 releases the area secured on the snap shot pool (releases the area which the snap shot to be destroyed secures). The destroying process is executed, for example, by deleting the specific generation data or the like.

The mount and unmount process 510 executes a mount and unmount of each of the volumes.

<Management of Snap Shot>

Figure 6:
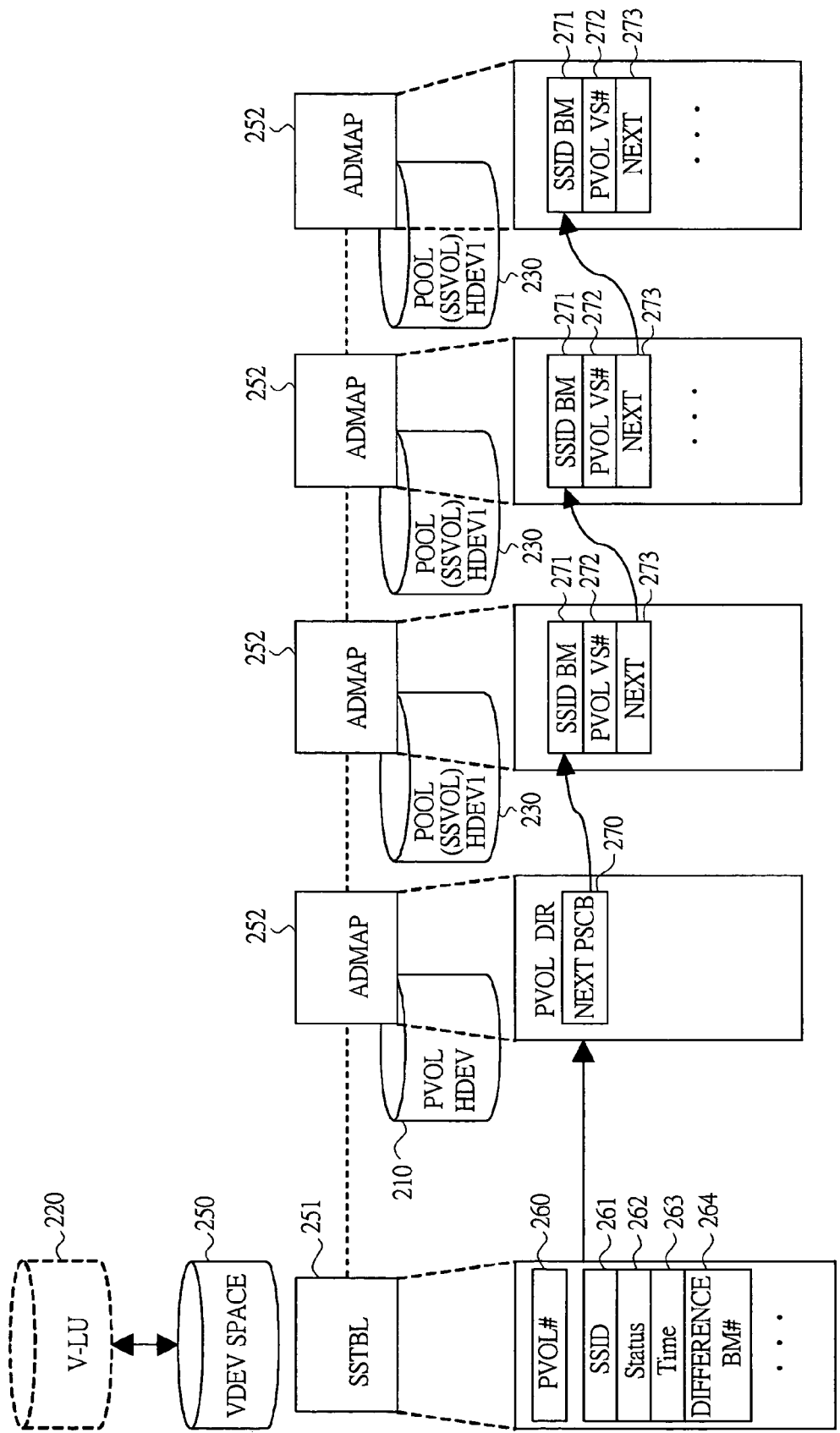
FIG. 6 is an explanatory view for explaining a management of the snap shot of the storage system in accordance with the embodiment of the present invention.
Figure 7:
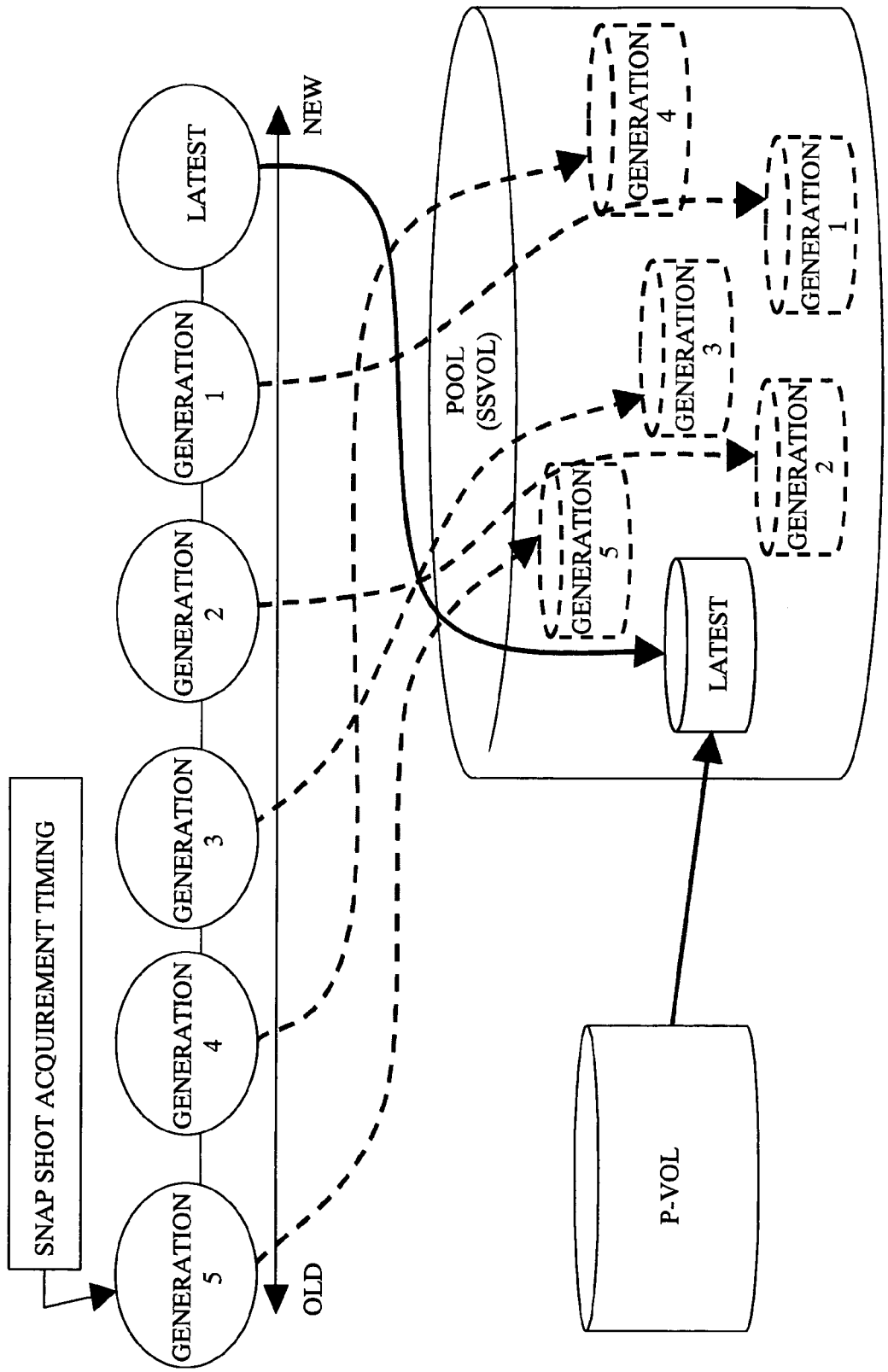
FIG. 7 is a view showing a state of a generation management of the snap shot of the storage system in accordance with the embodiment of the present invention.
Figure 8:
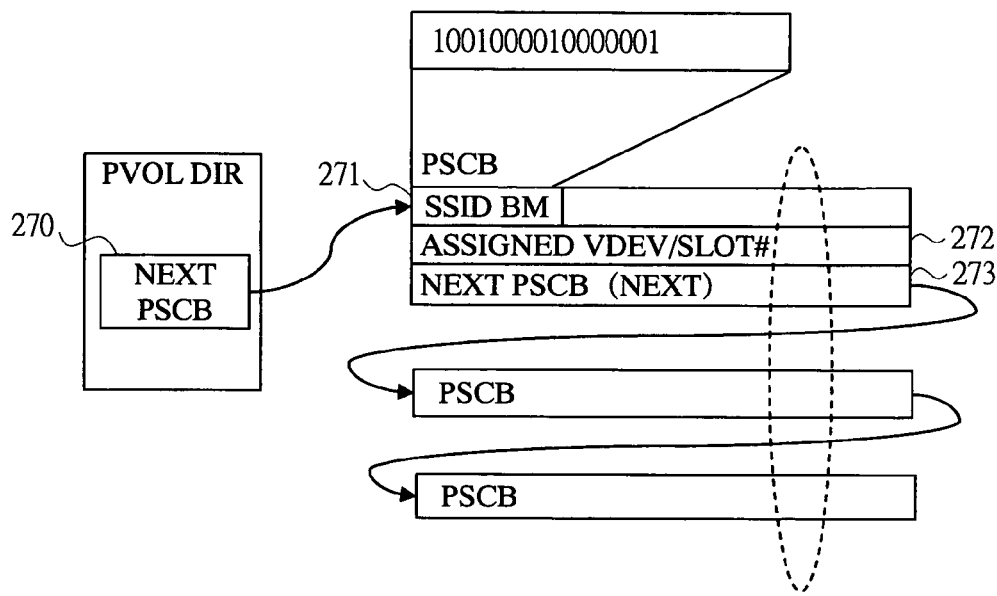
FIG. 8 is a view showing details of data in the generation management of the snap shot of the storage system in accordance with the embodiment of the present invention.
Figure 9:
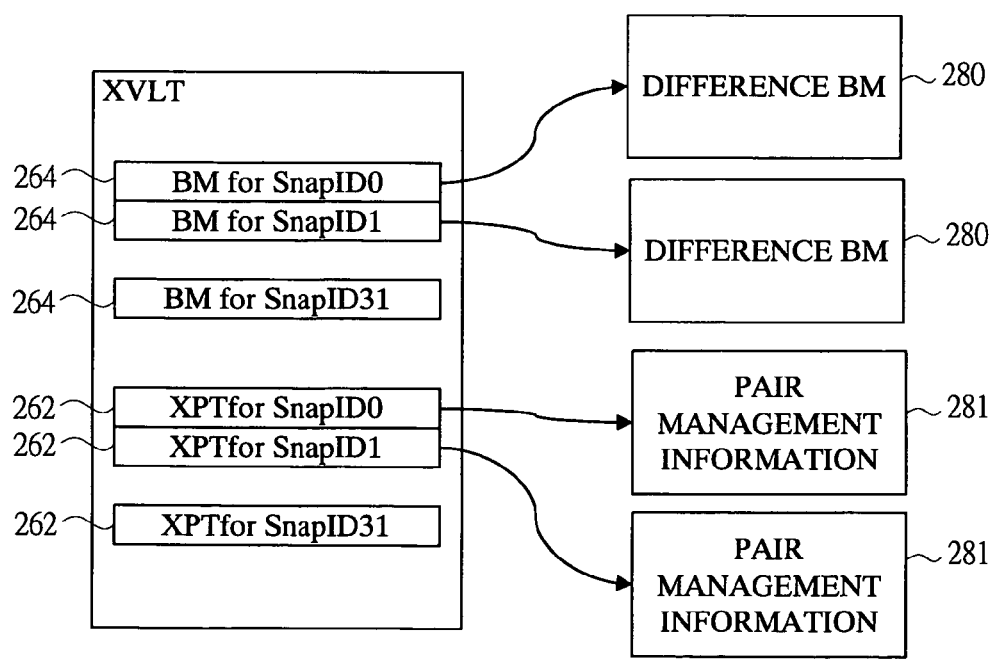
FIG. 9 is a view showing a data associated with a data within a snap shot table of the snap shot of the storage system in accordance with the embodiment of the present invention.

A description will be given of a management of the snap shot of the storage system in accordance with the embodiment of the present invention with reference to FIGS. 6 to 9. FIG. 6 is an explanatory view for explaining a management of the snap shot of the storage system in accordance with the embodiment of the present invention, FIG. 7 is a view showing a state of a generation management of the snap shot of the storage system in accordance with the embodiment of the present invention, FIG. 8 is a view showing details of data in the generation management of the snap shot of the storage system in accordance with the embodiment of the present invention, and FIG. 9 is a view showing a data associated with the data within the snap shot table of the snap shot of the storage system in accordance with the embodiment of the present invention.

In the snap shot, the structure is made such that a plurality of snap shots can be acquired, and a plurality of snap shots are managed in accordance with the generation.

As shown in FIG. 6, the virtual volume 220 is managed as the virtual device space 250, and the snap shot table 251 manages the respective address maps 252 of the primary volume 210 and the snap shot volume 230 serving as the pool.

Within the snap shot table 251, a snap shot ID 261, a snap shot pair status 262, a time 263, and a difference bit map number 264 are managed as much as a number of the snap shot, with respect to a primary volume number 260.

As the address map 252 of the primary volume 210, the data of a slot control block 270 in the latest generation is managed, and as the address map 252 of the snap shot volume 230 serving as the pool, there are managed a snap shot ID bit map 271 managing the data sharing between the snap shots, a slot number 272 of the primary volume 210, and the data of a one generation prior slot control block 273.

Accordingly, as shown in FIG. 7, the generations comprising the latest generation, the generation 1, the generation 2, the generation 3, the generation 4 and the generation 5 are managed and stored within the snap shot volume 230 with respect to the primary volume.

Further, the snap shot ID bit map 271 prepares the bit maps in correspondence to the number of the generations (for example, sixteen generations), as a method of managing the generation, with respect the slot (the track), for example, as shown in FIG. 8, and this shows that the track data is used in the snap shot generation in the on state. For example, in the case that the data of two bits or more is in the on state, it expresses that the data of the track is shared between a plurality of generations.

On the basis of the snap shot ID bit map 271, the data of a plurality of generations with respect to the slot of the same primary volume 210 is linked as shown by a dotted line in FIG. 8.

Further, as the data associated with the data within the snap shot table 251, a difference bit map 280 of the snap shot is associated in correspondence to the snap ID of each of the difference bit map numbers 264, and a pair management information 281 is associated in correspondence to the pair status 262 of the snap shot.

<Calculating Operation of Capacity Necessary at the time of Snap Shot>

Figure 10:
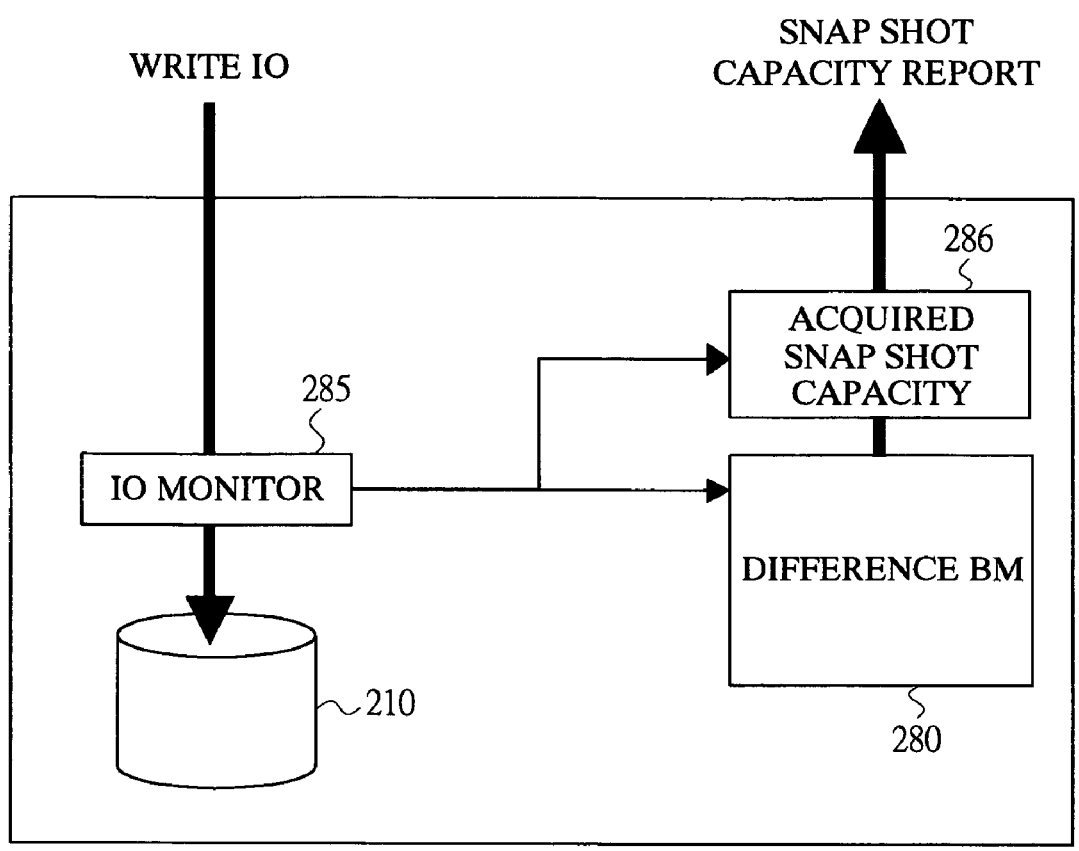
FIG. 10 is an explanatory view for explaining a calculating operation of a capacity necessary at the time of the snap shot of the storage system in accordance with the embodiment of the present invention.
Figure 11:
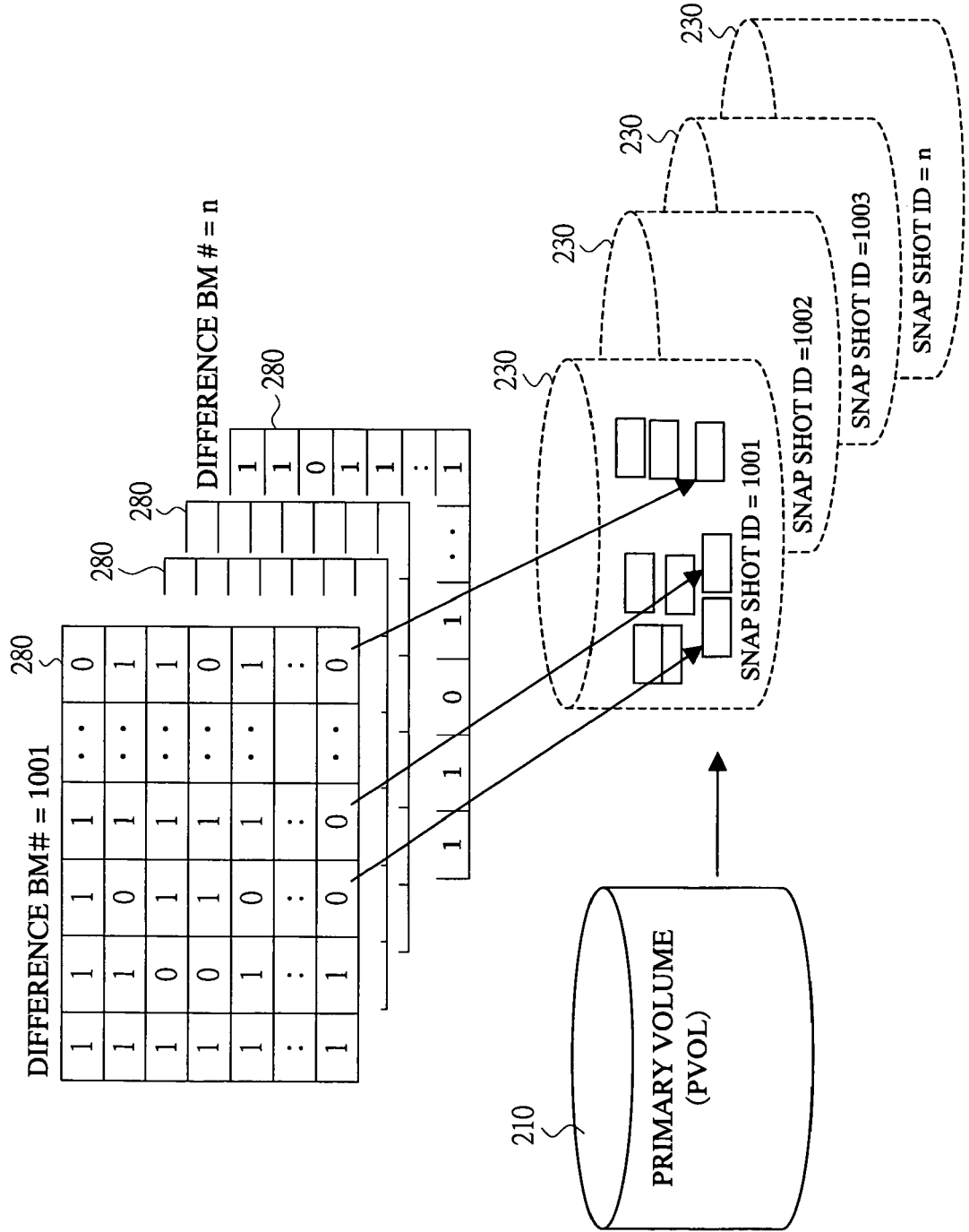
FIG. 11 is an explanatory view for explaining the calculating operation of the capacity necessary at the time of the snap shot of the storage system in accordance with the embodiment of the present invention.

Next, a description will be given of a calculating operation of a capacity necessary at the time of the snap shot of the storage system in accordance with the embodiment of the present invention, with reference to FIGS. 10 and 11. FIGS. 10 and 11 are explanatory views for explaining the calculating operation of the capacity necessary at the time of the snap shot of the storage system in accordance with the embodiment of the present invention.

The present embodiment is provided with a function of calculating the capacity necessary at the time of the snap shot without actually acquiring the snap shot (hereinafter, refer to a dry run function), and the structure is made such that it is possible to calculate the capacity necessary at the time of actually acquiring the snap shot, on the basis of the dry run function, and it is possible to automatically execute the actual snap shot process on the basis of the calculation result.

As a operation of the dry run function, as shown in FIG. 10, a write IO with respect to the primary volume 210 from the host processing system 300 is monitored by an IO monitor 285, and in the case that the write region is in a dry run snap shot acquiring range, the bit of the difference bit map 280 of the snap shot ID is turned off.

Here, a description will be given of details of the data within the difference bit map 280.

First, the snap shot ID is assigned per the snap shot acquirement, and the difference bit map 280 is assigned per the snap shot ID.

This difference bit map 280 is at first in a state in which all the bits are "1". The matter that the bit is "1" shows a state in which the snap shot copy is not taken with respect to a unit area (for example, the track) shown by the bit.

In other words, in the case that the write enters in the dry run subject volume, the bit of the difference bit map 280 is turned off in order to keep an old date serving as the snap shot copy.

The normal snap shot further comes to a process of evacuating the data before update, however, since a real evacuating process is not executed in the dry run function, and the copy is stopped, an actual copy region (the snap shot region) is not consumed.

Further, even if the write further comes to a portion in which the bit is already turned off, the difference bit remains in "0". This is not necessary because the data is evacuated with respect to the snap shot ID. Further, the difference management is executed independently with respect to the snap shot ID in the different generation, and in the case that the data is uniform between the generations, the structure is made, as shown in FIG. 8, such that the same data is shared by each of the generations and the capacity at that time can be made small.

Further, as mentioned above, there is not executed the process of preparing the snap shot from the old data of the primary volume 210 corresponding to the actual copy operation to the evacuation to the pool region of the snap shot volume 230, but only the update of the difference bit of the difference bit map 280 is executed.

Thereafter, on the basis of the user instruction or the demand from the external portion, the pool disk capacity which has been necessary if the snap shot has been actually acquired is calculated in accordance with the following calculation expression and reported, on the basis of the amount of the difference bit in the dry run snap shot region.

(capacity of unit area)×(number of off difference bit within difference bit map)=snap shot necessary capacity The pool disk capacity in accordance with the calculation expression may be calculated by referring to the number of the off difference bit within the difference bit map at a time point when the user instruction is generated or the demand is generated from the external portion, or the final capacity of the acquired snap shot capacity 286 may be calculated as the snap shot necessary capacity by acquiring the bit off information, for example, at a time when the bit of the difference bit map 280 is turned off, and adding the acquired snap shot capacity 286.

In this case, in the example shown in FIG. 10, the snap shot necessary capacity is calculated on the basis of the bit off information of the difference bit map 280 used at the time of the snap shot, however, the snap shot necessary capacity can be calculated by monitoring the write IO with respect to the primary volume 210 from the host processing system 300 by the IO monitor 285, thereby managing the monitor information.

On the basis of the operation of the dry run function, it is possible to execute only the update of the data within the difference bit map 280 managing the snap shot without executing the actual copy of the data to the snap shot volume 230, and it is possible to calculate the snap shot necessary capacity which is necessary at the time of actually executing the snap shot process.

Further, it is possible to allocate the plan of the snap shot plan which can be made use for the future, on the basis of the calculated snap shot necessary capacity, and it is possible to execute the thereafter automatic operation.

<Dry Run Instruction and Result Display>

Figure 13:
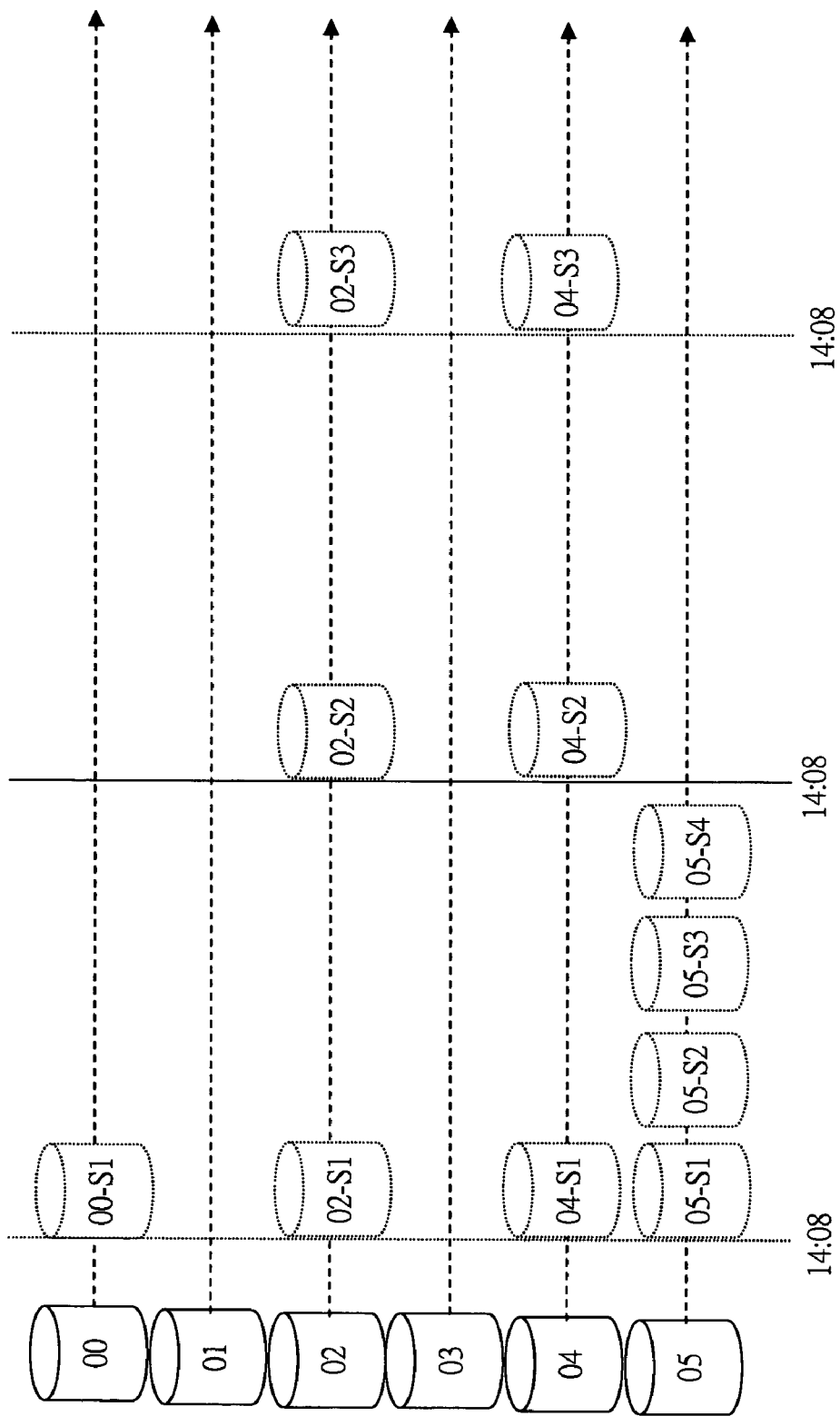
FIG. 13 is a view showing a state of the snap shot instructed by the dry run instruction display of the storage system in accordance with the embodiment of the present invention.
Figure 15:
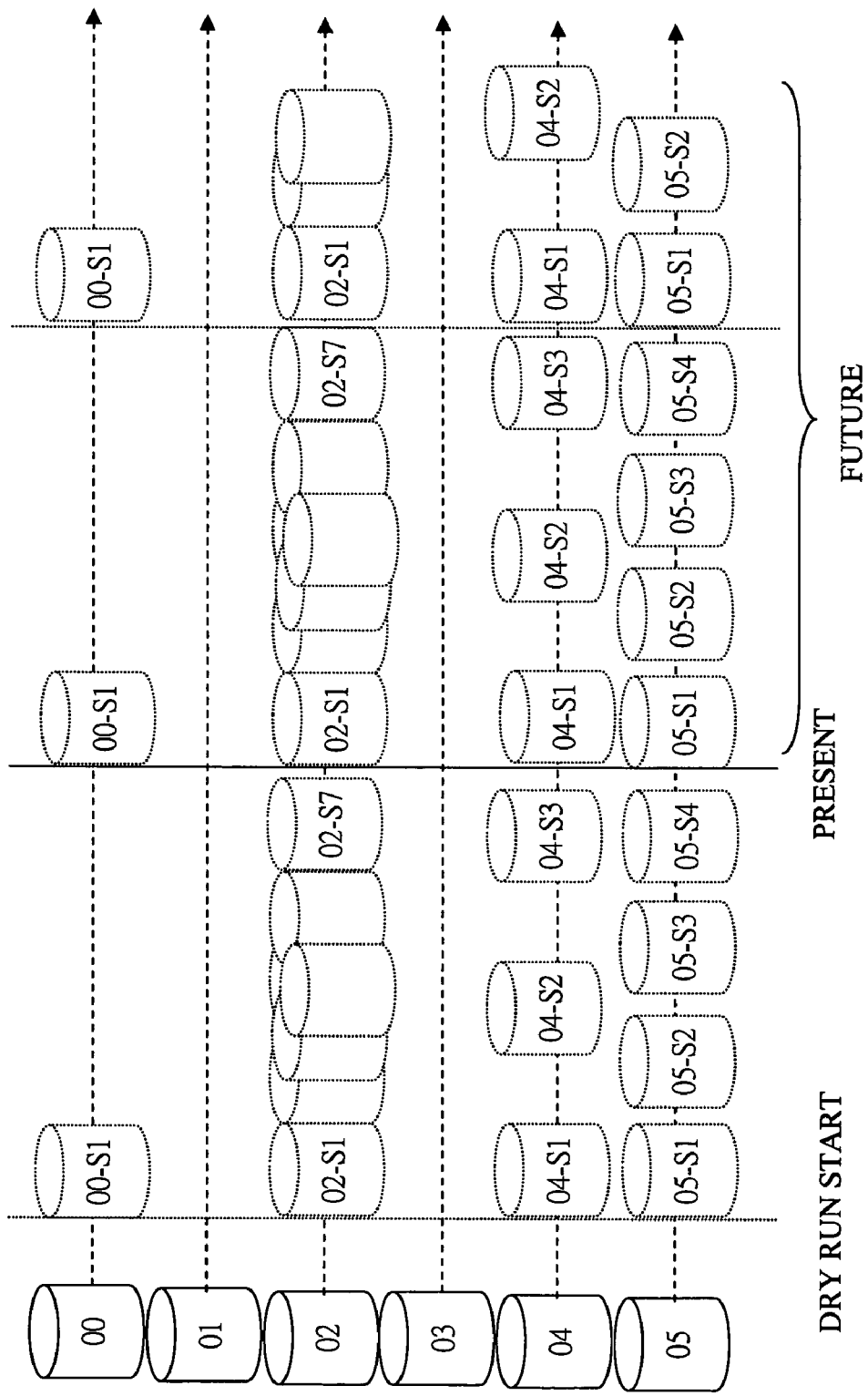
FIG. 15 is a view showing a state of the snap shot instructed by the dry run instruction display of the storage system in accordance with the embodiment of the present invention.

Next, a description will be given of a dry run instruction display of the storage system in accordance with the embodiment of the present invention. FIG. 12 is a view showing a dry run instruction display of the storage system in accordance with the embodiment of the present invention, FIG. 13 is a view showing a state of the snap shot instructed by the dry run instruction display of the storage system in accordance with the embodiment of the present invention, FIG. 14 is a view showing a dry run result display of the storage system in accordance with the embodiment of the present invention, and FIG. 15 is a view showing a state of the snap shot instructed by the dry run result display of the storage system in accordance with the embodiment of the present invention.

There is a case that the dry run is instructed from a built-in software of the host processing system 300, however, the example shown in FIG. 12 is expressed by a display image of the service processor 400 attached to the storage system 10.

It is possible to execute the actual snap shot acquirement and the dry run acquirement on the basis of the display shown in FIG. 12.

With respect to a control unit ID (CU number) 520 and a logical volume defined by a logical unit number (LU#) 521, in the case of setting to a dry run candidate, a column Snap Y/N 522 is checked. In the case that the snap shot is acquired at only one time, One Time 523 is checked, and in the case that that the snap shot is acquired every some hours, the corresponding times 524 to 526 are checked, whereby the snap shot acquirement plan can be prepared by inputting an acquirement generation number 527.

At this time, the process on the basis of the dry run function is achieved by checking Dry Run 528, and the normal snap shot acquiring process is achieved by checking Real Snap Shot 529.

Further, the prepared plan can be stored as a file by pressing SAVE 530, and it is possible to reread the stored content by pressing LOAD 531 later.

In the case of starting the dry run and the snap shot itself, the plan is started by pressing EXECUTE PLAN 532.

Further, in the case of suspending the already started dry run plan, STOP PLAN 534 is pushed, and in order to acquire the dry run result until the time point now, CAPACITY DISPLAY 533 is pushed.

For example, in the case of the snap shot acquiring plan shown in FIG. 12, the plan of acquiring the snap shot as shown in FIG. 13 is achieved.

Further, in the snap shot instruction as shown in FIG. 12, in the case of pressing CAPACITY DISPLAY 533 after executing the dry run, a dry run result as shown in FIG. 14 is displayed. The example shown in FIG. 14 expresses the result after seven days have passed.

As the information obtained by FIG. 14, there are shown an actual capacity 600 of the primary volume 210 corresponding to the snap shot subject, a necessary capacity 601 in correspondence to one generation necessary in the newest generation, a number of generation 602 which can be actually acquired and calculated by the dry run acquiring plan, a necessary capacity 603 in an entire of the acquired generation until the dry run result display time, and a number of generation 604 which can be acquired by the current structure in the case that the snap shot acquired subject VOL is not changed in this plan.

On the basis of the result, a case having a relation "acquired generation number 602>acquirable generation number 604" indicates the matter that the currently prepared copy capacity is short, and in this case, the matter that it is necessary to add the disks in correspondence to the capacity obtained by the expression (total necessary capacity)−(snap shot volume capacity in existing structure) is displayed to the user.

The dry run result shown in FIG. 14 is a future forecast on the basis of an assumption that the condition of the dry run period continues for the future in the same manner and the IO condition from the host at that time continues in the same manner as the dry run period, as shown in FIG. 15.

On the basis of the result mentioned above, it is apparent in accordance with the concrete trial that the acquirable generation number is necessarily reduced by increasing the snap shot acquired subject volume number, and the acquirable generation number is increased by narrowing down the snap shot acquired subject volume number on the contrary. Accordingly, it is possible to apply the material to the user for determination for considering what countermeasure the snap shot copy is acquired on the basis of, so that an automatic operation can be executed.

Further, since the snap shot acquiring plan at the time of executing the dry run is stored as a file, if the snap shot acquirement has not problem on the basis of the dry run result, it is possible to read the snap shot acquiring plan at the time of executing the dry run as it is, and it is possible to start the actual snap shot process.

Further, on the basis of the dry run result shown in FIG. 14, it is possible to execute the setting while giving preference to the generation number, the setting while giving preference to the acquired volume number and the like, and in this case, it is possible to display the information which can be acquired on the basis of the respective preferential settings.

<Processing Operation of Snap Shot Acquiring Plan of Storage System>

Figure 16:
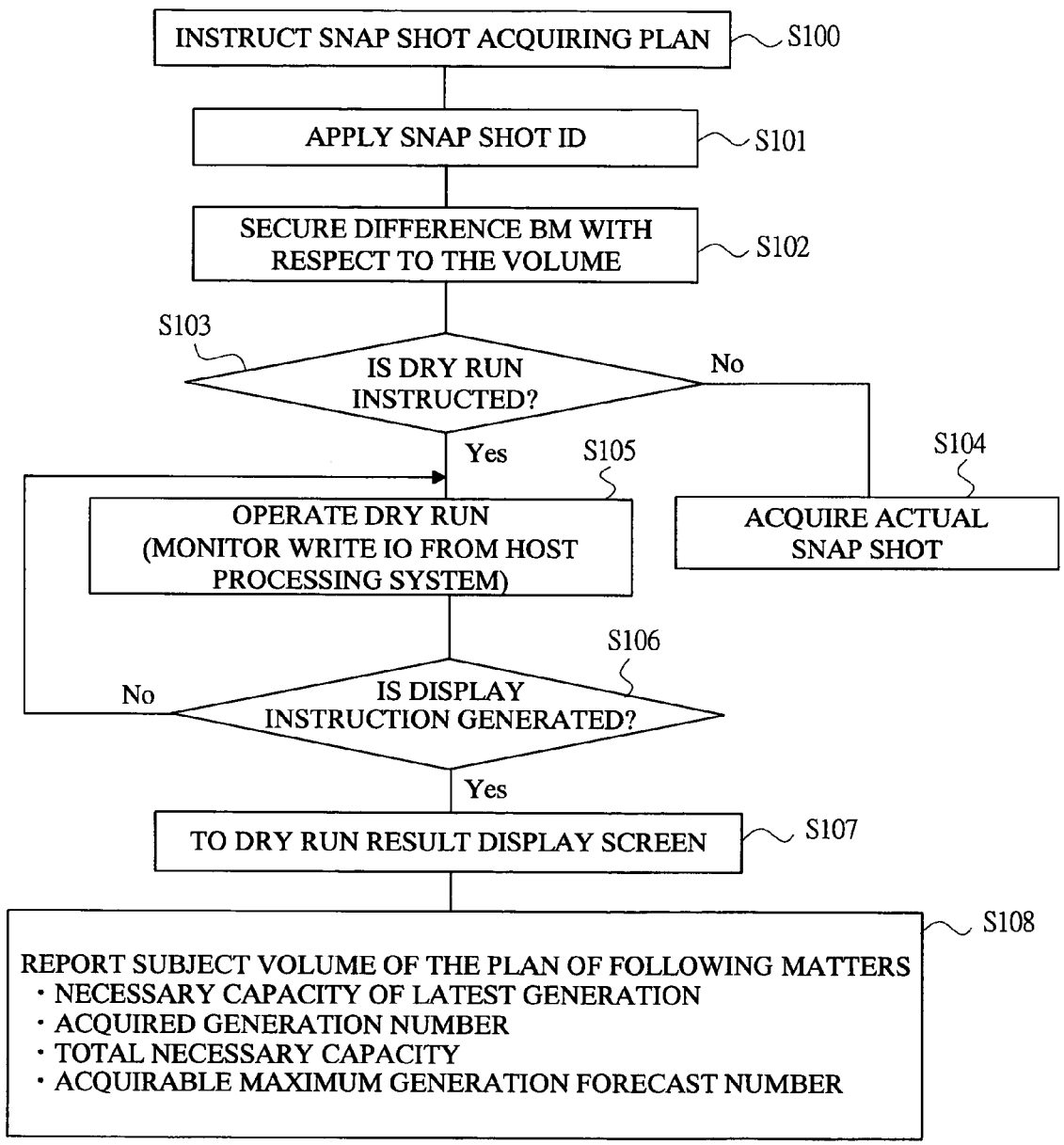
FIG. 16 is a flow chart showing a processing operation of a snap shot acquiring plan of the storage system in accordance with the embodiment of the present invention.
Figure 17:
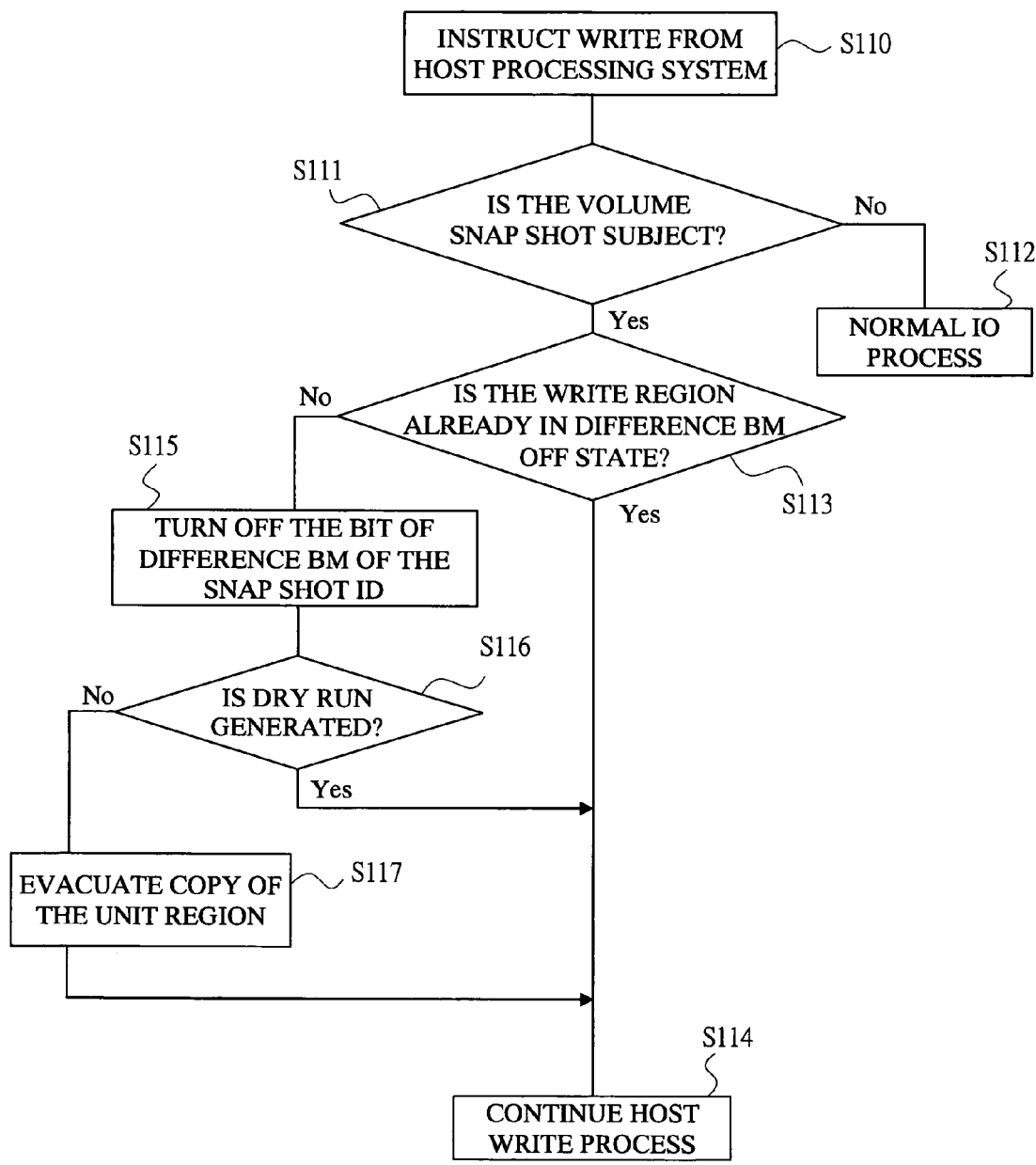
FIG. 17 is a flow chart showing an IO processing operation of the storage system in accordance with the embodiment of the present invention.

Next, a description will be given of a processing operation of a snap shot acquiring plan of the storage system in accordance with the embodiment of the present invention. FIG. 16 is a flow chart showing a processing operation of a snap shot acquiring plan of the storage system in accordance with the embodiment of the present invention, and FIG. 17 is a flow chart showing an IO processing operation of the storage system in accordance with the embodiment of the present invention.

First, in the case that the snap shot acquiring plan is instructed, for example, from the display screen as shown in FIG. 12 (S100), the processing operation of the snap shot acquiring plan applies a snap shot ID (S101), and secures the difference bit map 280 (S102) with respect to the volume.

Further, it is determined whether or not the dry run instruction is generated (S103), and if it is determined in S103 that the dry run instruction is not generated, the actual snap shot acquiring process is executed (S104).

Further, if it is determined in S103 that the dry run instruction is generated, the dry run operation is executed, and the write I/O from the host processing system 300 is monitored (S105).

Further, it is determined whether or not the display instruction from the display screen or the like as shown in FIG. 12 is generated (S106), and if it is determined in S106 that the display instruction is not generated, the step goes back to S105 and the dry run operation is carried over.

Further, if it is determined in S106 that the display instruction is generated, the dry run result display screen, for example, as shown in FIG. 13 is displayed (S107), and the following information is reported to the subject volume of the plan (S108).

Necessary capacity of latest generation

Acquired generation number

Total necessary capacity

Acquirable maximum generation forecast number

Further, in the write IO process from the host processing system 300 at the time of the snap shot and the dry run, in the case that the write instruction is output from the host processing system 300 (S110), it is determined whether or not the volume of the write instruction subject is the snap shot subject (S111), and the normal IO process is executed if it is determined that it is not the snap shot subject (S112).

Further, if it is determined in S111 that it is the snap shot subject, it is determined whether or not the write region is already in the bit map off state (S113), and the host write process is carried over if it is determined in S113 that it is in the bit map off state (S114).

Further, if it is determined in S113 that the it is not already in the bit map off state, the bit of the difference bit map 280 of the snap shot ID is turned off (S115).

Further, it is determined whether or not the dry run is generated (S116), and if it is determined in S116 that the dry run is generated, the host write process is carried over (S114), and if it is determined in S116 that the dry run is not generated, the actual snap shot acquiring process is executed, and the unit region is evacuated to the snap shot volume 230 (S117), and the host write process is carried over (S114).

In accordance with the process mentioned above, for example, if the process of the snap shot or the dry run is executed on the basis of the instruction by the instruction display as shown in FIG. 12, and the dry run result display instruction is output at the time of operating the dry run, it is possible to display the result in accordance with the dry run operation to the user.

In this case, in the example shown in FIG. 16, there are described the case that the dry run result display is executed without acquiring the snap shot, and the case that the snap shot is acquired without displaying the dry run result, however, it is possible to employ a structure that the result display of the dry run function is executed while acquiring the snap shot.

The description is in specific given above of the invention carried out by the inventors of the present application, on the basis of the embodiment, however, it goes without saying that the present invention is not limited to the embodiment mentioned above, and can be variously modified within the scope of the present invention.

A description will be given briefly of the effects obtained by the representative structure, in the invention disclosed in the present application.

In accordance with the present invention, it is possible to forecast the necessary capacity at the time of acquiring the snap shot copy without actually sampling the snap shot copy.

Further, in accordance with the present invention, it is possible to allocate the plan of the snap shot which can be made use in the future, on the basis of the forecasted result of the necessary capacity at the time of acquiring the snap shot copy.

What is claimed is:

1. A storage system provided with a storage control unit and a disk unit comprised of a plurality of physical storage devices, wherein the storage control unit comprises:

a data transfer control unit controlling a data transfer with respect to a host machine and the disk unit;

a cache memory temporarily storing the data; and a shared memory in which a configuration information of the storage system is stored, and wherein, in response to receiving an instruction to calculate a capacity necessary to acquire a snap shot which makes it possible to refer to the data within the disk unit at a certain time point, a monitoring interval being specified at the time the instruction is received, the storage control unit monitors a write instruction from the host machine for a predetermined period determined in accordance with the monitoring interval, and thereafter calculates the capacity necessary at the time of the snap shot, on the basis of the write requests monitored during the predetermined period, wherein the monitoring interval corresponds to a single snapshot generation and the predetermined period includes two or more snapshot generations, and wherein the storage control unit provides an operation plan of the snap shot including the calculation result of the capacity necessary at the time of acquiring the snap shot, said operation plan corresponding to the instruction to calculate and being displayed on the host machine or a service processor connected to the storage system and indicating whether a current storage capacity of the storage system is available to acquire the snap shot.

2. The storage system according to claim 1, wherein when calculating the capacity necessary at the time of acquiring the snap shot, the storage control unit counts a number of an updated unit region within the disk unit on the basis of a write instruction from the host machine for the predetermined period, and calculates the capacity necessary at the time of the snap shot on the basis of the count number and the capacity of the unit region.

3. The storage system according to claim 1, wherein the storage control unit manages information of the snap shot of a plurality of generations, and calculates a capacity considering a relation of the snap shot of the plurality of generations, in the case of calculating the capacity necessary at the time of acquiring the snap shot.

4. The storage system according to claim 3, wherein the storage control unit has a snap shot table managing information of a snap shot volume in which the snap shot of the plurality of generations is stored, and manages a relation of the snap shot of the plurality of generations on the basis of the snap shot table.

5. The storage system according to claim 4, wherein the storage control unit manages overlapping data in the snap shot of the plurality of generations in a sharing manner at the time of managing the relation of the snap shot of the plurality of generations.

6. The storage system according to claim 1, wherein the storage control unit displays a calculation result of the capacity necessary at the time of acquiring the snap shot on the host machine or a service processor connected to the storage system.

7. The storage system according to claim 1, wherein the operation plan of the snap shot comprises a snap shot capacity necessary for each of a plurality of logical units corresponding to said physical storage devices, and wherein the snap shot capacity for each of said logical units is displayed on the host machine or service processor.

8. The storage system according to claim 1 wherein the operation plan comprises the capacity necessary to perform the snapshot, a number of snapshot generations monitored, and a number of acquirable snapshot generations.

9. A storage system provided with a storage control unit and a disk unit, wherein the storage control unit comprises:
a data transfer control unit controlling a data transfer with respect to a host machine and the disk unit;
a cache memory temporarily storing the data; and
a shared memory in which a configuration information of the storage system is stored wherein said disk unit comprises a primary volume and a secondary volume, and
wherein, in response to receiving an instruction to calculate a capacity necessary to acquire a snapshot which makes it possible to refer to the data within the disk unit at a certain time point, a monitoring interval being specified at the time the instruction is received, the storage control unit updates a difference bitmap on the basis of write instructions from the host machine over a predetermined period determined in accordance with monitoring interval and calculates the capacity necessary to acquire the snap shot without executing the snap shot copy operation,
wherein the monitoring interval corresponds to a single snapshot generation and the predetermined period includes two or more snapshot generations.

wherein the storage control unit provides an operation plan of the snap shot on the basis of the calculation result of the capacity necessary at the time of acquiring the snap shot, said operation plan corresponding to the instruction to calculate and being displayed on the host machine or a service processor connected to the storage system and indicating whether a current storage capacity of the storage system is available to acquire the snap shot, and wherein if the instruction to calculate the capacity necessary at the time of acquiring a snap shot which makes it possible to refer to the data at a certain time point within the disk unit is not received, the storage control unit executes a snapshot copy to the snap shot volume without first performing a capacity calculation.

10. The storage system according to claim 9, wherein when calculating the capacity necessary at the time of acquiring the snap shot, the storage control unit acquires information of the difference bit map updated by the write instruction from the host machine for the predetermined period, and calculates the capacity necessary at the time of the snap shot on the basis of the information of the updated bit number and the capacity of the unit region managed by the difference bit map.

11. The storage system according to claim 9, wherein when calculating the capacity necessary at the time of acquiring the snap shot, the storage control unit counts information of a bit off from the difference bit map updated on the basis of a write instruction from the host machine for the predetermined period, and calculates the capacity necessary at the time of the snap shot on the basis of the information of the count number and the capacity of the unit region managed by the difference bit map.

12. The storage system according to claim 9, wherein the storage control unit manages information of the snap shot of a plurality of generations, and calculates the capacity considering a relation of the snap shot of the plurality of generations, in the case of calculating the capacity necessary at the time of acquiring the snap shot.

13. The storage system according to claim 12, wherein the storage control unit has a snap shot table managing information of a snap shot volume in which the snap shot of the plurality of generations is stored, and manages a relation of the snap shot of the plurality of generations on the basis of the snap shot table.

14. The storage system according to claim 13, wherein the storage control unit manages overlapping data in the snap shot of the plurality of generations in a sharing manner at the time of managing the relation of the snap shot of the plurality of generations.

15. The storage system according to claim 9, wherein the storage control unit displays a calculation result of the capacity necessary at the time of acquiring the snap shot on the host machine or a service processor connected to the storage system.

16. The storage system according to claim 9, wherein the operation plan of the snap shot comprises a snap shot capacity necessary for each of a plurality of logical units, and wherein the snap shot capacity for each of said logical units is displayed on the host machine or service processor.

17. The storage system according to claim 9 wherein the operation plan comprises the capacity necessary to perform the snapshot, a number of snapshot generations monitored, and a number of acquirable snapshot generations.

18. A control method of a storage system provided with a storage control unit comprised of a data transfer control unit controlling a data transfer with respect to a host machine and a disk unit, a cache memory temporarily storing the data, and a shared memory in which a configuration information of the storage system is stored and with a disk unit comprised of a plurality of physical storage devices, wherein, in response to receiving an instruction to calculate a capacity necessary to acquire a snap shot which makes it possible to refer to the data at a certain time point within the disk unit, a monitoring interval being specified at the time the instruction is received, a write instruction from the host machine is monitored for a predetermined period determined in accordance with the monitoring interval, and thereafter the capacity necessary at the time of acquiring the snap shot is calculated on the basis of the write requests monitored during the predetermined period, and wherein the monitoring interval corresponds to a single snapshot generation and the predetermined period includes two or more snapshot generations.

19. The control method of a storage system according to claim 18, wherein when calculating the capacity necessary at the time of acquiring the snap shot, a number of an updated unit region within the disk unit is counted on the basis of a write instruction from the host machine for the predetermined period, and the capacity necessary at the time of the snap shot is calculated on the basis of the count number and the capacity of the unit region.

20. The control method of a storage system according to claim 18, wherein an information of the snap shot of a plurality of generations is managed, and a capacity considering a relation of the snap shot of the plurality of generations is calculated when calculating the capacity necessary at the time of the snap shot.

21. The control method of a storage system according to claim 20, wherein a snap shot table for managing information of a snap shot volume in which the snap shot of the plurality of generations is stored is used, and a relation of the snap shot of the plurality of snap shot is managed on the basis of the snap shot table.

22. The control method of a storage system according to claim 2, wherein the overlapping data in the snap shot of the plurality of generations in a sharing manner is managed at the time of managing the relation of the snap shot of the plurality of generations.

23. The control method of a storage system according to claim 18, wherein an operation plan of the snap shot is provided on the basis of the calculation result of the capacity necessary at the time of acquiring the snap shot, wherein said operation plan comprises a snap shot capacity necessary for each of a plurality of logical units corresponding to said physical storage devices, and wherein the snap shot capacity for each of said logical units is displayed on the host machine or at a service processor.

24. The storage system according to claim 18 wherein the operation plan comprises the capacity necessary to perform the snapshot, a number of snapshot generations monitored, and a number of acquirable snapshot generations.

* * * * *